(12) United States Patent
Arensdorf et al.

(10) Patent No.: US 8,128,334 B2
(45) Date of Patent: Mar. 6, 2012

(54) SYSTEM FOR MOBILIZATION OF STOCKED GONDOLAS

(75) Inventors: Brad Arensdorf, Jacksonville, FL (US); Troy Thompson, Perry, FL (US); William Thompson, Perry, FL (US)

(73) Assignee: Mobex of North America, Inc., Jacksonville, FL (US)

( * ) Notice: Subject to any disclaimer, the term of this patent is extended or adjusted under 35 U.S.C. 154(b) by 507 days.

(21) Appl. No.: 12/364,177

(22) Filed: Feb. 2, 2009

(65) Prior Publication Data

US 2010/0196128 A1     Aug. 5, 2010

(51) Int. Cl.
*B60P 3/00*     (2006.01)

(52) U.S. Cl. ........ 414/458; 414/495; 414/607; 414/608; 414/814; 254/2 R

(58) Field of Classification Search .................... 414/11, 414/458, 607, 495, 608, 814; 254/2 R; 280/416.3
See application file for complete search history.

(56) References Cited

U.S. PATENT DOCUMENTS 1,396,952 A * 11/1921 Fowkes et al. ................ 254/103

(Continued)

OTHER PUBLICATIONS

Photographs taken on Nov. 7, 2007 of inventor working with existing equipment, 14 pages, 14 photographs.

*Primary Examiner* — Scott Lowe
(74) *Attorney, Agent, or Firm* — Christopher Paradies; Fowler White Boggs P.A.

(57) ABSTRACT

A support assembly provides for a method of mobilization that does not require removal of shelving and restocking of items on gondolas and warehouse pallet racking, even if the gondola or pallet racking is too wide for prior art mobilization methods. The support assembly comprises a pair of tubular members capable of engaging fork-like extensions of a hand truck or the like. The hand truck may have caster wheels for mobilization and may have a lifting mechanism for raising and lowering the support assembly by the fork-like extensions, when tongues extending from the tubular members are aligned and matingly engaged at a middle support and outer supports of the gondola. By using a plurality of such lift assemblies engaged along the length of the gondola or gondola run, a row of gondolas may be lifted and mobilized without removing shelving and restocking items on the shelves, even if the gondola is wide and the items stocked on the shelves of the gondola add substantial weight to the gondola. A push pull rod may be engaged at a engaging loop attached on a lower portion of each of the lift assemblies or a plurality of push pull rods may be engaged at a plurality of the engaging loops, transferring user force on the push pull rods to the lift assemblies as low on the lift assemblies as possible.

11 Claims, 13 Drawing Sheets

U.S. PATENT DOCUMENTS

| | | | | |
|---|---|---|---|---|
| 4,921,264 A | * | 5/1990 | Duffy | 280/79.11 |
| 4,934,893 A | | 6/1990 | Johnson | |
| 5,018,930 A | * | 5/1991 | Hardin et al. | 414/458 |
| 5,087,167 A | * | 2/1992 | Johnston | 414/668 |
| 5,193,828 A | * | 3/1993 | Benvenuti | 280/43.24 |
| 5,595,469 A | * | 1/1997 | Evans | 414/458 |
| 5,660,518 A | * | 8/1997 | Meier | 414/458 |
| 5,716,186 A | | 2/1998 | Jensen et al. | |
| 5,782,600 A | | 7/1998 | Walsh | |
| 6,095,537 A | | 8/2000 | Cozza et al. | |
| 7,311,487 B1 | | 12/2007 | Crossley et al. | |
| 2003/0091417 A1 | * | 5/2003 | Swann | 414/458 |
| 2003/0215314 A1 | * | 11/2003 | Klokke | 414/495 |
| 2004/0021280 A1 | | 2/2004 | Peggs | |
| 2005/0225047 A1 | | 10/2005 | Schilling et al. | |
| 2007/0059138 A1 | | 3/2007 | Cozza | |
| 2007/0194546 A1 | | 8/2007 | Cozza et al. | |
| 2009/0183954 A1 | | 7/2009 | Cozza et al. | |
| 2009/0185885 A1 | | 7/2009 | Cozza et al. | |

* cited by examiner

200

229  200

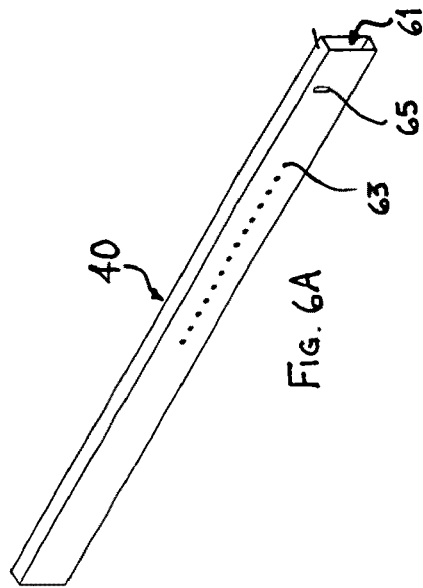
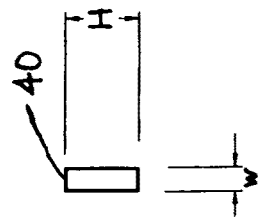
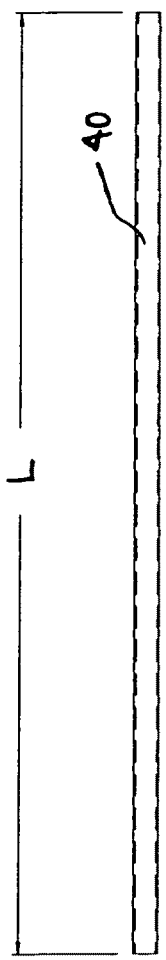
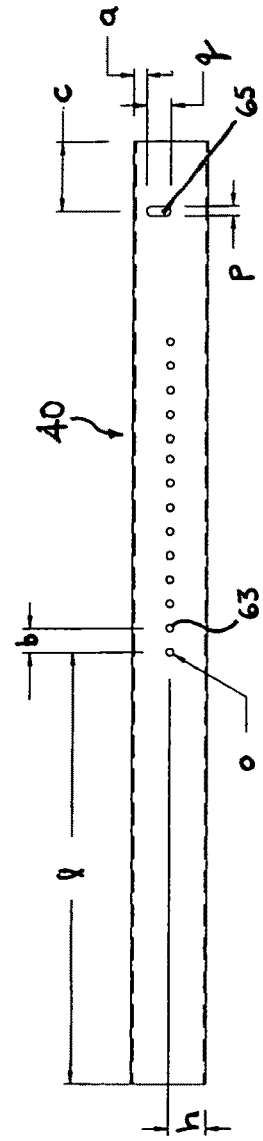

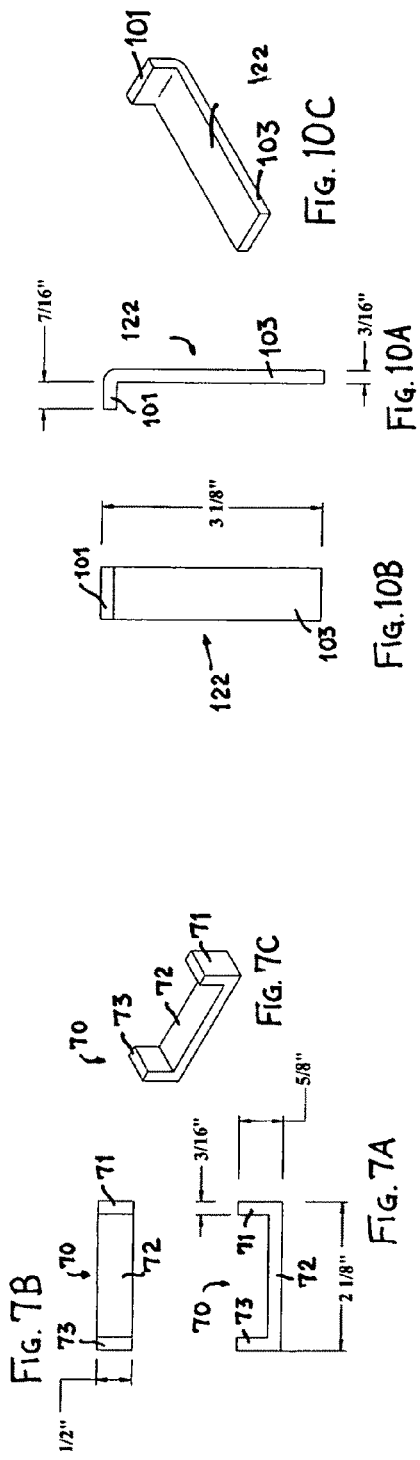

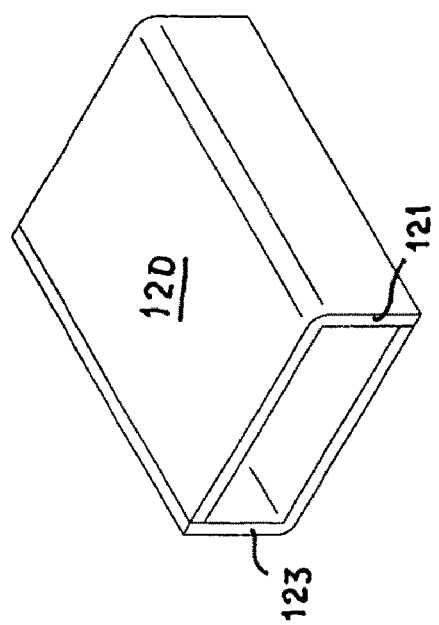
FIG. 9B
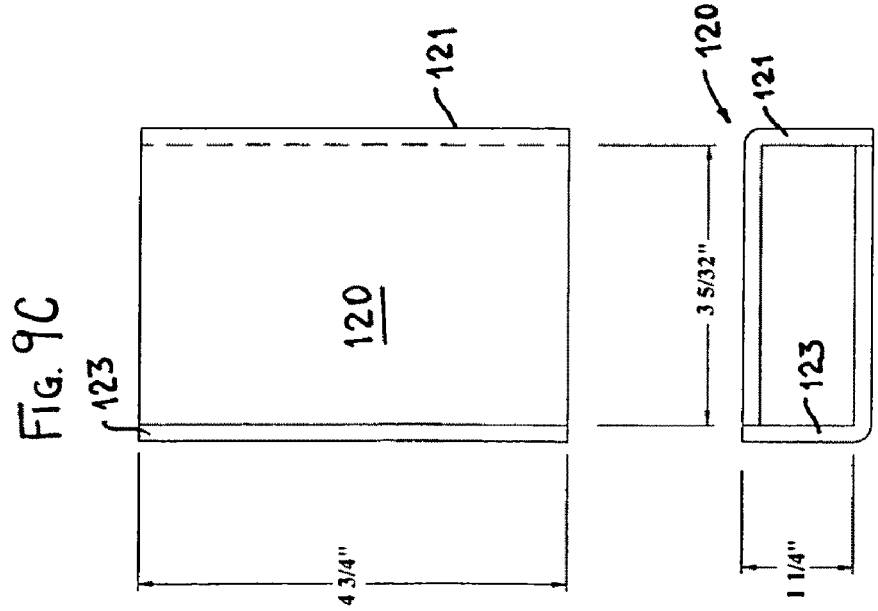
FIG. 9C
FIG. 9A

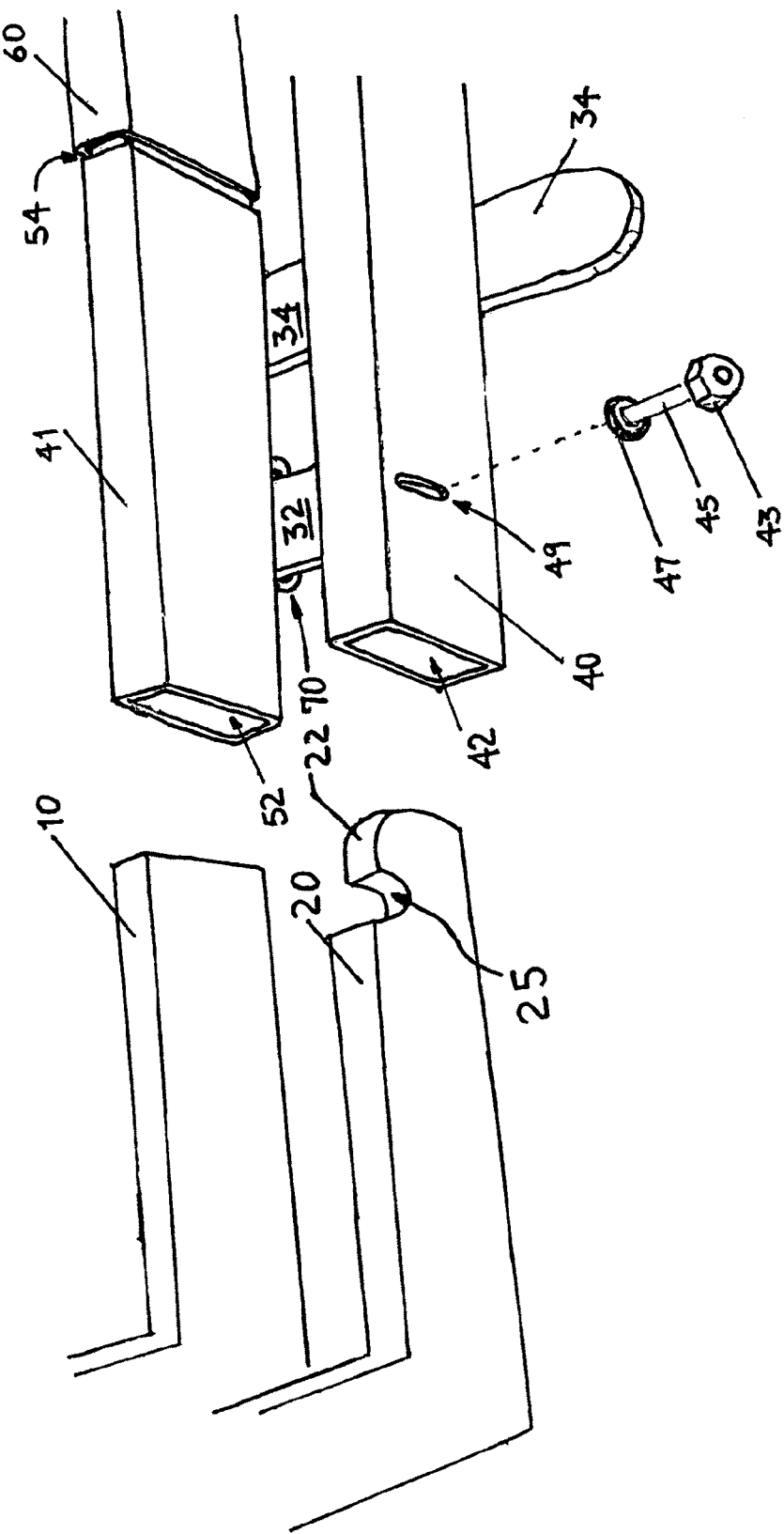

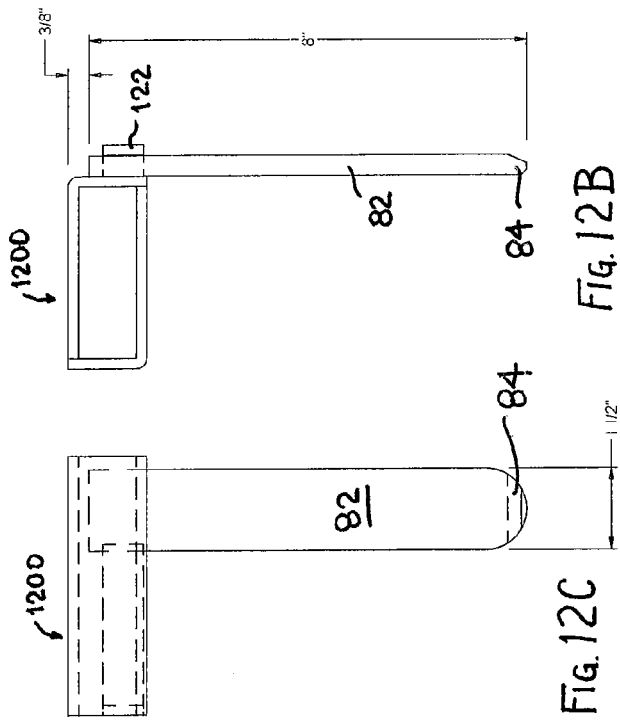
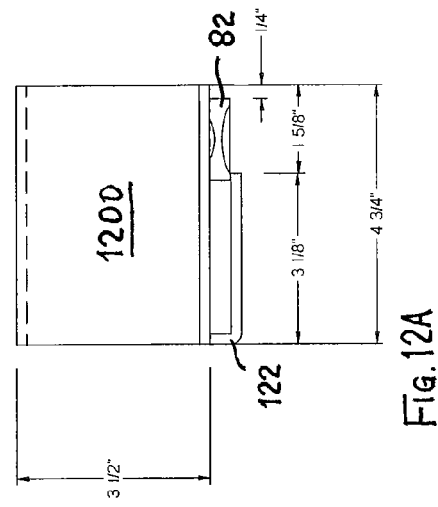
Fig. 12B
Fig. 12C
Fig. 12A

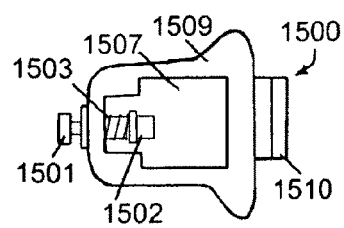
FIG. 15D
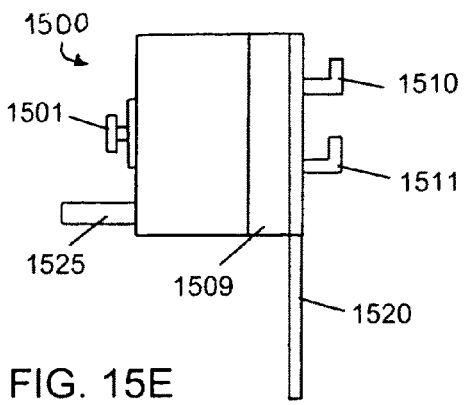
FIG. 15E
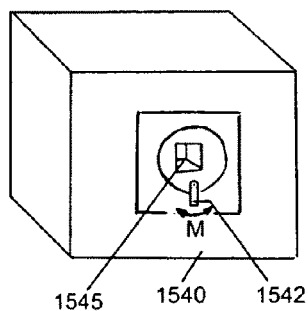
FIG. 15B
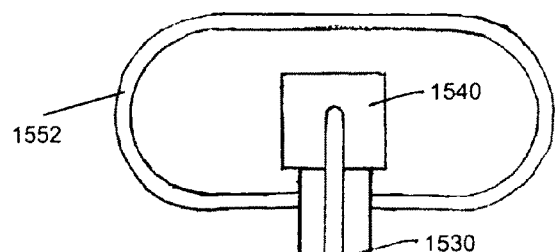
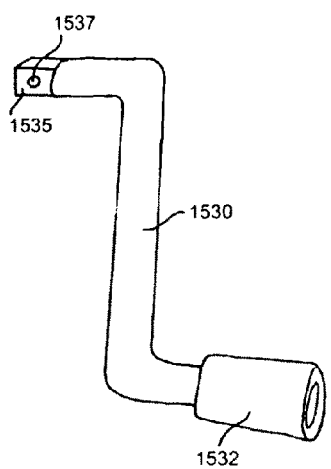
FIG. 15C
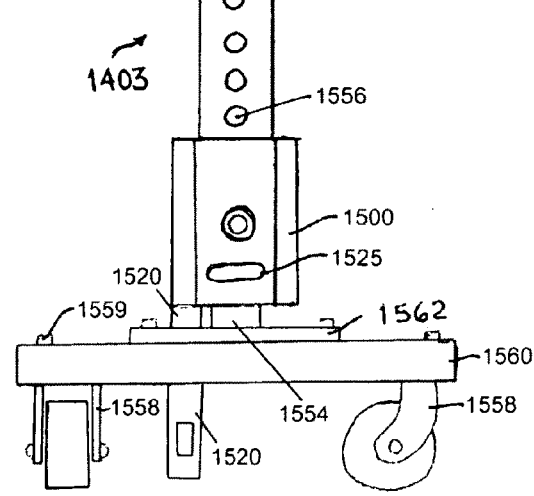
FIG. 15A

SYSTEM FOR MOBILIZATION OF STOCKED GONDOLAS

FIELD OF THE INVENTION

The field relates to an apparatus for lifting gondolas and pallet racking in a retail, wholesale or warehouse environment.

BACKGROUND

Within the context of this specification, gondola, gondola run, gondolas and gondola islands all refer to store shelving known in the field. Gondolas, such as the one depicted in FIGS. 13A-13C, are known with or without a central support column and with one or two sides having shelving attached. Warehouse pallet racking is also known, such as pallet racking used in home centers and warehouses. Unless otherwise expressly indicated, the term gondolas refers to both a single gondola or a gondola run having a plurality of gondolas or both.

Lifting systems are known that use a plurality of caster wheels to mobilize empty gondolas or gondolas that have at least a portion of the racked products removed from the gondolas. U.S. Patent Publication 2007/0194546, published Aug. 23, 2007, and U.S. Patent Publication 2007/0059138, published Mar. 15, 2007 illustrate systems with a screw or hydraulic jack for lifting gondolas, the description and drawings of which are hereby incorporated for background herein. Two devices are disposed on opposite sides of the gondolas at each upright support, which may be accessible behind a kick plate. Each upright support is raised using the lifting apparatus and the gondola, even if quite long, is movable using the lifting system as a hand truck, with each of the hand trucks being moved at the same time.

However, deep gondolas and gondolas with products racked on the gondolas cannot be moved using these known devices. An upright support in the middle of a gondola, between two opposite sides of the gondola, bows excessively, causing damage to the gondola support structure and tumbling of the products. Thus, a time consuming unracking and reracking of at least a significant portion of the products on the gondolas is required in order to mobilize the gondolas.

SUMMARY

A system for mobilizing stocked gondolas and pallet racking allows for the mobilization without removing shelving and without removing the products from the shelving of the gondolas or pallet racking. In one example, the system is telescoping or extendable to fit gondolas or pallet racking having various depths, widths and/or configurations, such as configurations of support structures. In another example, the system includes a lifting mechanism attachable at an end of a gondola or for attaching to an H-support or other upright support of pallet racking, such as for use in mobilization of the pallet racking.

Using the system for mobilizing a gondola permits even very deep and very wide gondolas to be mobilized, without unracking and/or disassembly of the gondolas and/or removal of product from the shelves. In one example, a pair of opposing members are positioned such that the members extend along the depth of the gondola from one side to an opposite side of the gondola. Each of the pair of opposing members are positioned such that the pair of members are disposed on opposite sides of a gondola support. A slidable middle lift bracket on each of the pair of opposing members is positioned at the middle, upright support of the gondola. Each of the pair of opposing members may have additional lift brackets disposed at other upright support members of the gondola. An interlinking tongue and loop system may be used to slide under the supports and to engage one lift bracket to its opposite lift bracket. Thus, the pair of opposing members may provide rigid support to the gondola, when the pair of opposing members are lifted, allowing for mobilization of the gondola.

A lifting system, such as one of the known lifting systems or the examples of the new lifting systems disclosed herein, may be modified to engage each end of each of the opposing members. In one example, a screw or hydraulic mechanism of a lifting system is coupled with a pair of forks, such that the forks may be raised and lowered together, at the same time. The forks are capable of engaging the pair of opposing members, for example.

One advantage of the system that is not found in any known system is the ability of the system to lift and mobilize stocked gondolas, without unstocking and restocking shelves, regardless of the length or depth of the gondolas. This saves an enormous amount of manual labor, revolutionizing the industry. A test of the system in a retail establishment stunned the proprietor with the ease and rate of mobilization of stocked gondolas.

In one example, a hand crank, such as a hand crank and screw similar to that of a boat trailer hitch apparatus, is used to lift a pair of forks inserted into the opposing members. A screw and handcrank is capable of replacing a heavier, more expensive and harder to maintain hydraulic jack, for example, when a plurality of such lift mechanism are coupled to opposite ends of a plurality of the support apparatuses spaced at intervals along a gondola run. No single lift mechanism is required to exceed its rated lifting potential. The lack of any significant sagging from one side of the gondola reduces the height that the lift must raise the gondola to mobilize it, because the support bar is capable of supporting the supporting structure of the gondola a plurality of support points, such as three or more support points. In some of the examples, three support points are disclosed, but additional support points may be added in other applications requiring support of larger spans, for example.

Single sided gondolas and islands may be raised and lowered similarly to the double sided gondolas provided in the examples. In single sided gondolas, a support bar may be supported on only one side by a lift mechanism or on both sides. If supported on only one side by a lift mechanism, the other end of the support bar may be unsupported, requiring a counterbalance on the lift mechanism, or may be provided with a low-profile caster wheel that provides a fulcrum at an opposite end of the support bar assembly for lifting of the gondola during raising of the end of the support bar assembly attached to the lift mechanism, for example. In this way, a gondola having one side against a wall may be mobilized, for example, using a plurality of lift mechanisms along the side of the gondola facing away from the wall, only, while the low-profile casters inserted into or onto the support bar assemblies allow the support bar assemblies to be inserted and aligned under the gondolas.

Instead of forks, other structures may be used to mount the lifting apparatus to the support structures used in lifting of the gondolas or to the gondolas, themselves. These other structures may be grabs, bolts or fingers, for example. Grabs are L-shaped extensions from a surface of the lift mechanism that are capable of engaging slots in a coupling mechanism or a gondola. For example, forks may be attached to an attachment member having slots that engage the grabs, allowing the forks to be positioned in the ends of the gondola support bars prior to engaging the lift apparatus to the forks. Then, the lift apparatus may be positioned such that the grabs engage the slots in the attachment member of the forks, and the lift apparatus may be raised until the grabs firmly engage in the slots prior to raising the gondolas. Bolts are fasteners extending from the lift mechanisms that are coupled with nuts or plates having a threaded or other coupling mechanism for attachment to the bolts when inserted through a hole or slot in the gondolas or the attachment member of the forks, for example. Fingers are projections, shaped or straight that matingly engage the gondola or the attachment member of the forks, for example. Thus, when properly engaged to the supports or the gondolas, the lift mechanism provides for a positive displacement upward and downward.

The reduction in labor and expense for mobilizing gondolas using examples of the present inventions are surprising and unexpected. Experienced grocers and other retails are amazed at the rapid setup and complete of large mobilization projects using the systems described.

BRIEF DESCRIPTION OF THE DRAWINGS

FIG. 1B illustrates a top plan view with broken lines representing hidden features.

FIG. 6A illustrates a perspective view of an extendable tube for use in fabricating an extendable member of the system of FIG. 1A and FIG. 1B.

FIG. 6B illustrates a side view of the extendable tube of FIG. 6A.

FIG. 6C illustrates a top view of the extendable tube of FIG. 6A.

FIG. 6D illustrates an end view of the extendable tube of FIG. 6A.

FIGS. 7A-7C illustrate views of a retaining member.

FIGS. 8A-8C illustrate views of a tongue.

FIG. 9A-9C illustrate views of a tube fabricated from two L-shaped members.

FIGS. 10A-10C illustrate views of a retaining member for a middle slide bracket.

FIGS. 11A and 11B illustrate a mating portion of a lifting apparatus for use with examples of a mobilization system.

FIGS. 12A-12C illustrate views of a middle slide bracket.

FIGS. 15A-15E illustrate sketches of an example of a lifting mechanism.

DETAILED DESCRIPTION

Figure 1C:
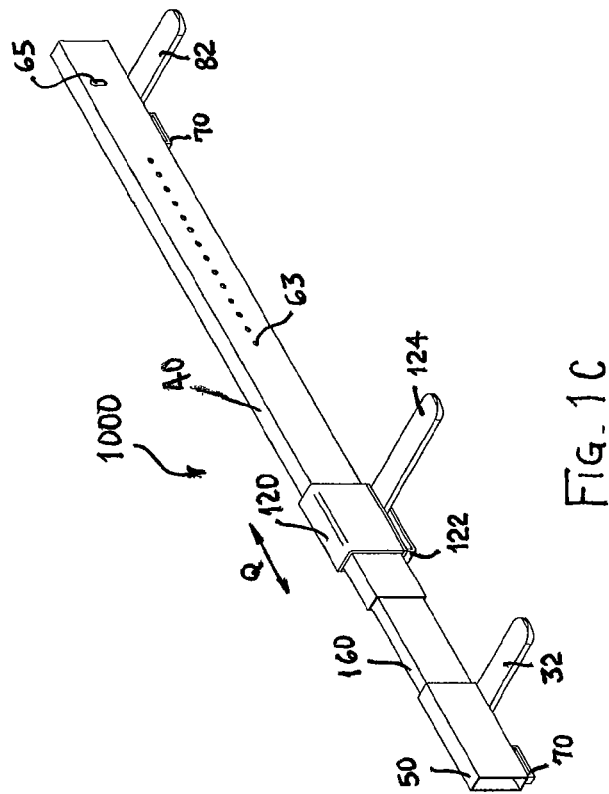
FIGS. 1A-1C illustrate views of one example of a support bar assembly of a mobilization system for lifting and mobilization of gondolas.
Figure 1A:
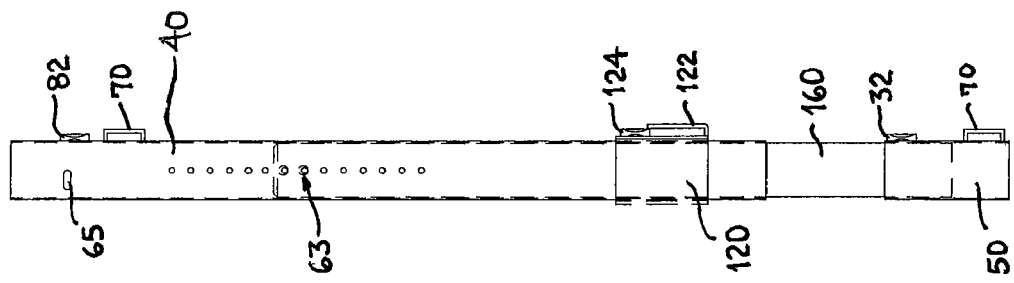
Figure 1B:

Many variations and combinations of the component parts illustrated in the drawings and disclosed in the examples are included within the scope of the invention. FIGS. 1A-1C illustrate an example of a support bar assembly 1000 of a mobilization system for stocked gondolas 1. A system comprises two opposing, complementary assemblies 1000 that have brackets 50, 120 and one or more extendable members 40, 160—with tongues 32, 124, 82 that fit into receiving members 70, 122 of one assembly 1000 opposite from the other assembly 1000. The tongues 32, 124, 82 and receiving members 70, 122 interlock and support a plurality of support points of a gondola, such as the middle support B and outer supports A, C of gondola 1, as illustrated in the sketch of the example of FIG. 14. The gondola 1 may be stocked with items 3 on the shelves during mobilization of the gondola 1.

Figure 2A:
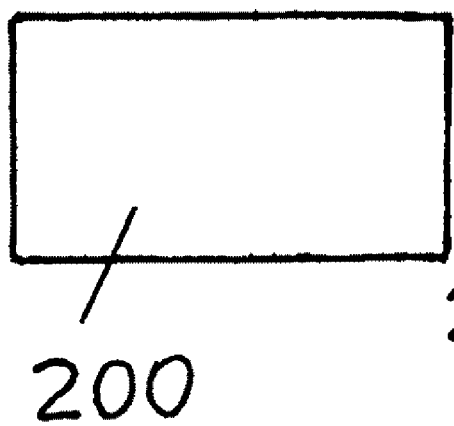
FIGS. 2A and 2B illustrate views of a tube having a channel.
Figure 5A:
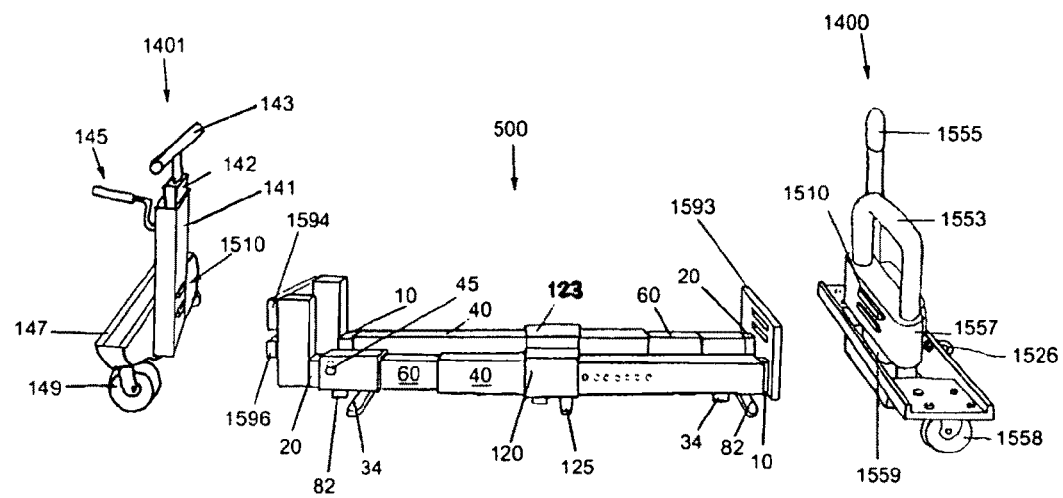
FIGS. 5A and 5B are perspective sketches of an example of (A) a system for mobilization of stocked gondolas mounted on two different types of manual lift trucks and (B) a push-pull bar.

Components may be fabricated, such as by welding and assembly, to provide a pair of complementary, opposing support bar assemblies 1000, such as illustrated schematically in the sketch of FIG. 5A. FIG. 2A shows a side plan view of a tube used in fabricating components of the examples. The tube 200 may be made of a rigid material having a sufficient stiffness and other mechanical properties to safely raise and move gondolas together with items stocked on the gondolas. The dimensions of the tube 200 are selected to provide sufficient stiffness and to mate with other components of the assemblies 1000. For example, components may be coupled telescopically, as illustrated in FIG. 1A-1C. The height H of a support component, such as the extendable member 40 in FIG. 6D, must be able to fit under the bottom shelf of a gondola, if a solid kick plate is removed or if an open-faced kick plate is present or otherwise. The length of a support component L, such as an extendable member 40 of FIG. 6C, may be selected to allow the assembly 1000 to extend from one side of a gondola to the other, when coupled telescopically with other components of the assembly 1000. A plurality of opposing assemblies 1000 may be coupled at a plurality of supports along the length of a gondola or gondola run, such as a gondola run running the length of an aisle in a store. By installing a plurality of the assemblies 1000 along the length of the gondolas, the entire aisle of gondolas may be lifted and mobilized, together with shelving and products displayed on the shelving, for example.

On one end of an assembly 1000, an end bracket 50 may be attached to an extendable member 160, which may be telescopically mated with another extendable member 40, for example. An end bracket 50 may be coupled to an extendable member 40, 160 by any means, such as by welding, fastening, bonding or the like. In one example, an extendable member 40 has an integrated end bracket with a slot 65 for holding a pin, as illustrated in detail in FIGS. 6B and 11B, and a retaining member 70 and tongue 82 welded to a bottom portion of the extendable member 40. The slot may have a length q greater than its width p, as illustrated in FIG. 6B, and may be a distance from the top of the member 40 and at a distance c from the end of the member 40. The distances a, c may be selected to align the slot 65 with a recess 25 in one of the forks 20, as illustrated in FIG. 11A, for example.

In one example of an extendable member 40, fourteen through holes 63 or recesses may be provided at a height h and starting at a distance I from one end of the extendable member 40 as illustrated in more detail in FIG. 6A-6C. The holes may be disposed at a distance b one from the other, for example, such that telescopically inserted second extendable member 160 may be coupled by a retainer in one or more of the holes 63 of the first extendable member 40 having the holes 63, as illustrated in FIGS. 1A and 1B, which show the second extendable member 160 extending into the first extendable member 40, using broken lines to show the hidden portion of extendable member 160 inside the other extendable member 40. The holes 63 may be provided for convenience and flexibility in adjusting the length of a support bar 1000 during installing and disassembly of the system, for example.

Figure 2B:
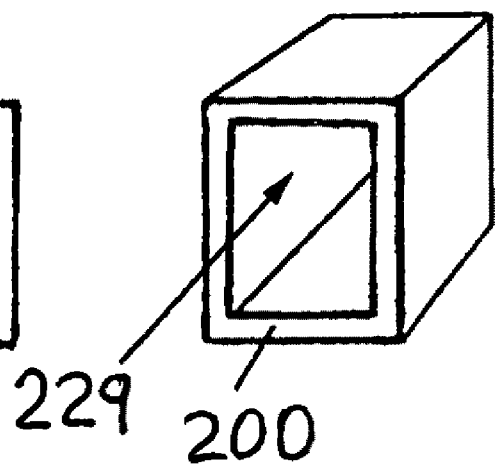
Figure 14:
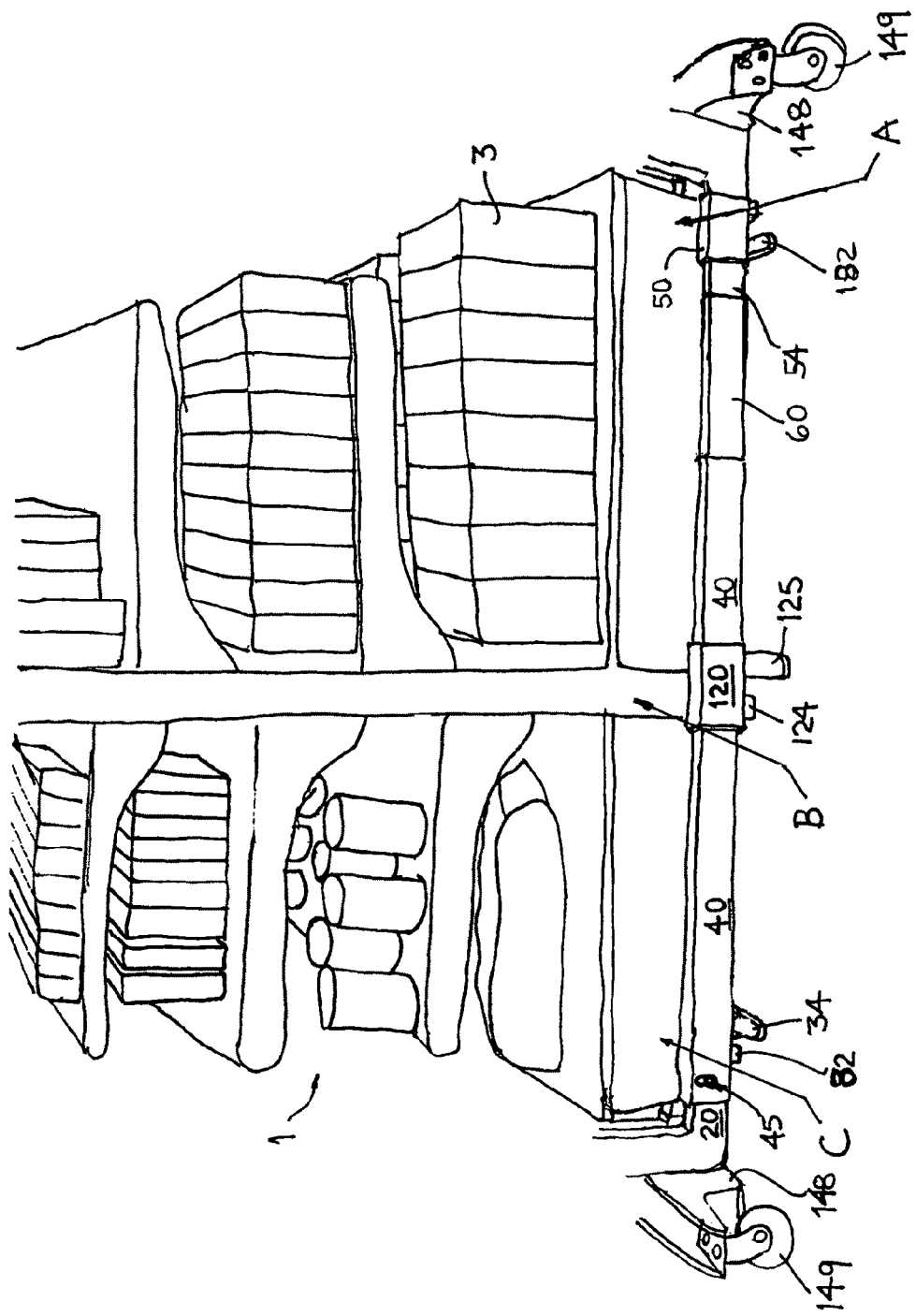
FIG. 14 illustrates a sketch of an example of a portion of a lifting apparatus for mobilization of stocked gondolas assembled and installed on one end of a gondola having products displayed on the shelving of the gondola.

FIG. 2B shows a perspective view of a tube 200 having a channel 229 extending along the length of a tube 200. The example of a tube 200, as illustrated in FIGS. 2A and 2B may be used to fabricate components of the support bar assembly 1000, for example. The channel 229 may have another tube inserted along the channel, providing for a telescopic fit of one tube inside of the other or a sliding fit of a bracket made from the tube on another tube. Thus, the tube 200 may cooperatively engage another tube or a solid member for extending along the axis of the tube 200. In this way, the system may be adjusted in length to accommodate a variety of gondolas with varying lengths, depths, widths and configurations. For example, a middle slide bracket 120 may be fabricated from such a tube 200 and may be slidably disposed on the extendable member 40, as illustrated in FIG. 1C. The slide bracket 120 is moveable in either direction Q along the extendable member 40, allowing the slide bracket 120 to be aligned with a central support B of a gondola 1, for example, as illustrated in FIG. 14. A middle slide bracket 120, as illustrated in the example of FIGS. 9A-9C, may be fabricated by tube forming or by welding or otherwise binding together of two L-shaped members 121, 123 to form the tube 200. FIGS. 12A-12C illustrate a detail view of such a slide bracket 1200 having a tongue 82 and a retainer 122 welded to the bottom of one of the L-shaped members 121, 123 that form the tube 200, for example. Dimensions shown are provided as an example, only.

A tongue 82 may have a tapered end 84, such as illustrated in the detail view of FIGS. 8A-8C, for example. In one example, the tongue 82 has material removed, such as by machining or grinding, to form the tapered end 84. In another example, the tapered end 84 of the tongue 82 is forged into shape. The tapered end 84 is insertable to provide support under a gondola 1 support A, B, C and extends through a retaining member 122 of an opposite positioned assembly 1000, for example.

Figure 3A:
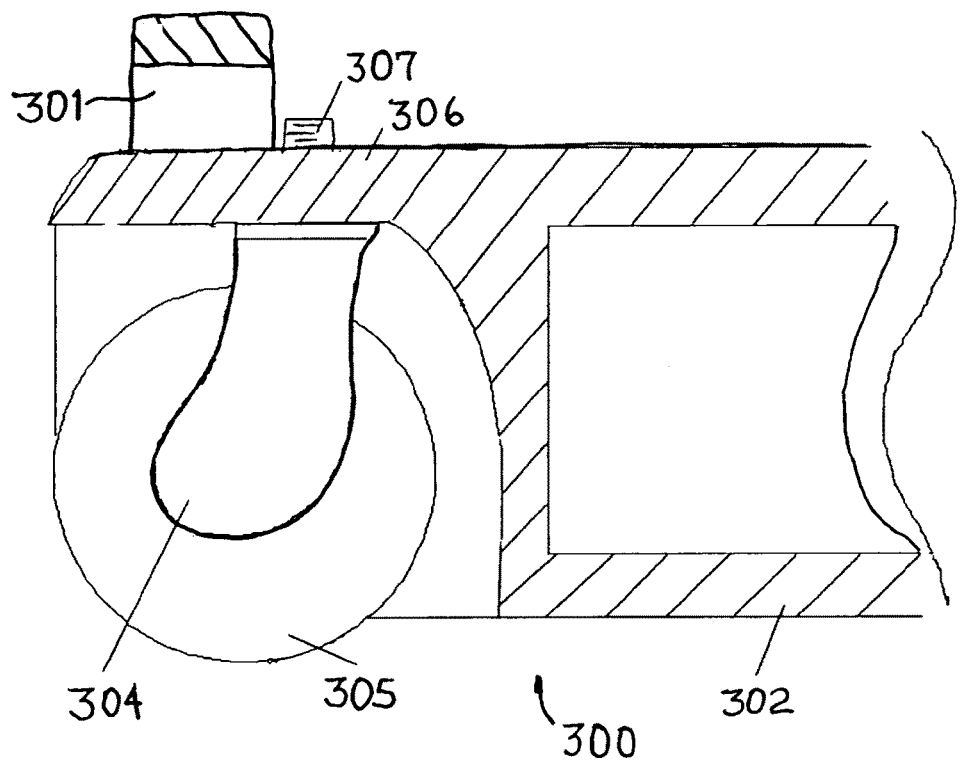
FIGS. 3A-3B illustrate (A) a partial cross sectional view of an example of a caster wheel insert 300 for single-sided gondola mobilization, and (B) an end portion 302 for coupling with an end of a support bar assembly.
Figure 3B:
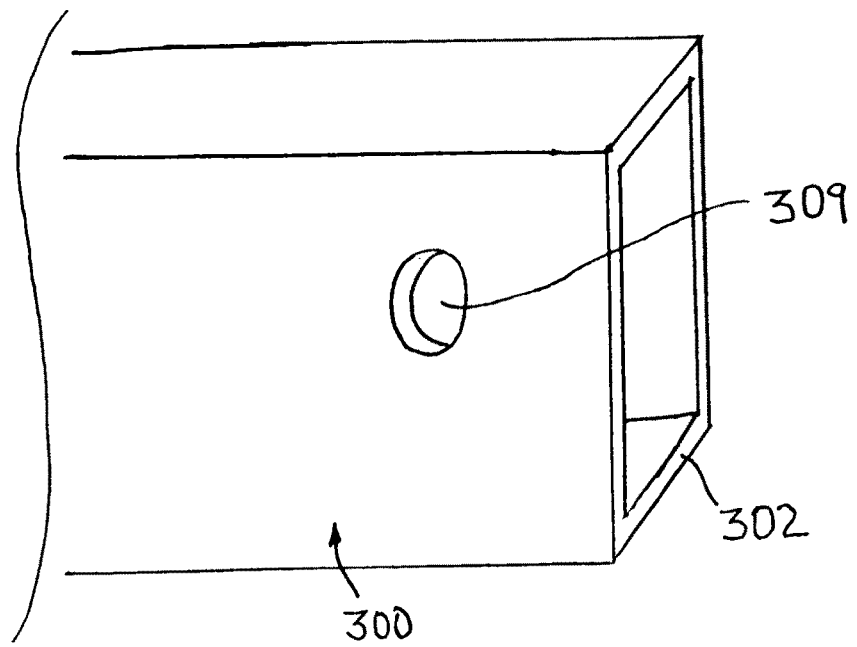

FIGS. 3A-3B illustrate (A) a partial cross sectional view of an example of a caster wheel assembly 300 for single-sided gondola mobilization, and (B) an end portion 302 for insertably coupling with an end of a support bar assembly. Other end portions may be used to couple with the support bar assembly. A caster wheel 304 multi-directionally couples a wheel 305 to a coupling member 306, such as by a threaded lug 307. The wheel 305 pivots freely about a rotational axis that may be aligned with the axis of the lug 307, for example. A cavity is formed by the coupling member 306 that permits free pivoting of the wheel 305 within the cavity during mobilization of the gondolas. The wheel 305 extends below the end portion 302 used for coupling with the support bar assembly. By extending slightly below the support bar assembly, the wheel 305 may acts as a fulcrum point for raising a gondola, when support bar assemblies having the caster wheel assembly 300 coupled at one end are raised at an opposite end by a lift mechanism. In one example, the end portion 302 is coupled to the support bar assembly by inserting the end portion 302 into the support bar assembly in the same manner as one of the forks of a lift mechanism would be inserted into the support bar assembly. A slot or hole 309 may be provided for insertion of a pin to retain the end portion 302 within the support bar assembly, for example.

One-sided gondolas and islands may be raised and lowered similarly to the double sided gondolas provided in the example of FIG. 14. In single sided gondolas, a support bar may be supported on only one side by a lift mechanism or on both sides. If supported on only one side by a lift mechanism, then other end of the support bar may be unsupported, requiring a counterbalance on the lift mechanism, or may be provided with a low-profile caster wheel assembly 300, such as illustrated in FIGS. 3A and 3B, for example. In this way, a gondola having one side against a wall may be mobilized, for example, using a plurality of lift mechanisms along the side of the gondola facing away from the wall, without the use of any other special equipment than the caster wheel assemblies 300. Thus, a system for mobilization of double-sided gondolas 1 may be used for single-sided gondolas positioned against a wall, without much modification to the method or equipment. A push/pull rod or other device may be coupled to a mounting bracket 301, which may be coupled to the caster wheel assembly 300, for example, to assist in the pushing or pulling of gondolas 1. In another example, a pair of caster wheel assemblies 300 may be used for one or more of the pair of opposing support bar assemblies 1000 in mobilization of double sided gondolas 1 or gondola islands.

Figures 4A, 4B:
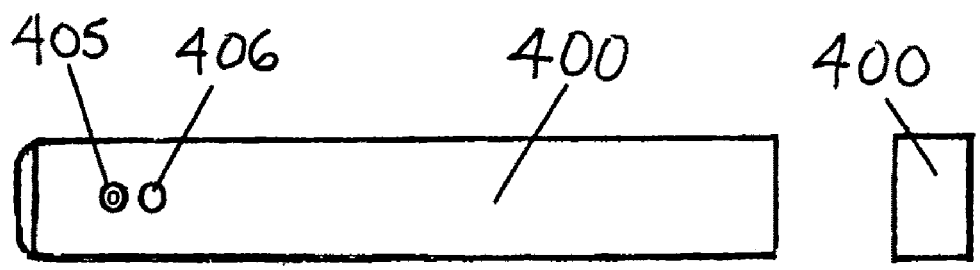
FIG. 4A illustrates a side view of an extendable member for insertion telescopically into a receiving extendable member of the example illustrated in FIGS. 1A-1C.
FIG. 4B illustrates an end plan view of the extendable member of FIG. 4A.

FIGS. 4A and 4B show an extendable member 400 for insertion into a receiving extendable member 40. A detent ball 405 provides for retaining of the member in the receiving member 40, for example. Alternatively or additionally, a pin may be inserted through a hole 406 in the member.

FIG. 5A provides a sketch of an assembled example of pair of support assemblies 500 of a system for mobilization of stocked gondolas mounted on two different types of manual lift trucks 1400, 1401. One of the lift trucks 1401 uses a lift mechanism similar to a boat trailer jack. A boat trailer jack uses a hand crank to raise and lower the boat and to give the trailer mobility, in some instances, when the jack has one or more caster wheels. A rack and pinion gear mechanism may be used to translate rotational motion of a hand crank to translational motion of the jack raising and lowering the gondolas, for example. The other truck 1400 uses a hydraulic jack 1559, for example. Any jack with sufficient force to lift the gondolas may be used with a hand truck of the type known in the art to lift and mobilize the gondolas. The hydraulic truck 1400 has a hydraulic jack 1559 mounted between a base and a height adjustable lifting mechanism 1557. The lifting mechanism may have one or more grabs 1510 for coupling to a mounting fixture, such as a plate 1593 or slats 1594, 1596. A handle 1553 is provided in FIG. 5A for positioning and coupling the hydraulic lift 1400 to the support assembly 500. A push-pull rod 1580 may be coupled by a hook to an eye bolt 1526 or a U-shaped attachment point 1525 on a truck 1400, 1403, as illustrated in FIGS. 5A and 15A, respectively.

FIG. 6A shows a perspective view of an example of an extendable member 40 that has a channel 61 for mating with a fork-like extension, for example. The member 40 may itself be inserted into a channel of another tube. As sketched in the example of FIG. 5A, a support assembly 500 may comprise a pair of opposing support bar assemblies 1000. In the detailed views of FIGS. 1A-1C, one end bracket 50 slips telescopically over a first end of an intermediate extendable member 160, and an elongated member 40 slips telescopically over an opposite end of the intermediate member 160. The elongated member 40 in this example has a plurality of holes 63 extending through the thickness of at least one outer wall of the tubular member 40, such that a pin or detent ball or both may be used to couple the elongated member 40 and the intermediate extendable member 160, preventing relative movement of the two members 40, 160 during mobilization of a gondola or a pallet racking. In FIG. 5A a partial exploded view illustrates the alignment and positioning of two examples of trucks 1400, 1401 with one using a hand crank 145 for raising and lowering the system and the other using a hydraulic jack handle 1555 to raise and lower a hydraulic jack 1559 that raises and lowers the system. One end 41 may be coupled to the other tube 40, 60, 160 by an intermediate member 54, as illustrated in the example of FIG. 11B, for example. Regardless of the type of coupling of one member of a support bar to another, tongues 32, 34 and retainers 70 are aligned between the right-hand and left-hand support bars to provide an interlocking fit, for example.

As illustrated in the drawings of the system, a receiving member 70 is attached to opposing members and is disposed to receive the tongue of the opposing member. A receiving member 70 has a first end 73 and a second end 71 that are attachable to a portion of the system and a body 72 connecting the first end 73 and the second end 71, as illustrated in the views of FIGS. 7A-7C, for example.

FIGS. 8A and 8B illustrate a tongue 82 having a tapered end 84. A tongue 82 and a receiving member 70, 122 may be assembled with a tube 200 to form a bracket. A receiving member 70, 122 may be used, as illustrated in FIGS. 7A-7C and FIGS. 10A-10C, for example. The bracket 1200 in FIGS. 12A-12C is assembled using the tube 200 of FIGS. 2A and 2B with the receiving member 122 of FIGS. 10A-10C and a tongue 82, such as by welding, for use as a slidable, middle bracket for engaging the gondolas at a middle shelf support B. This middle bracket 1200 allows very heavy gondolas and very deep gondolas to be moved without removing the shelves and products, for example. The tongue 82 may be welded to the tube 200 and the receiving member 122, as illustrated in FIGS. 12A-12C, for example. The assembly provides for an interlocking of the tongues 82, 124, 125 of opposing assemblies 1000.

FIGS. 11A and 11B show a portion of a manual truck having forked extensions 10, 20, extending fork-like, that mate with tubes 40, 41. The extensions 10, 20 fit into the channels 42, 52 of their respective tubes 40, 41, as illustrated in FIG. 11B, for example. One of the ends may have a pin 45 inserted through a slot 49 formed in the end of the member 40, and the pin 45 may be disposed such that it engages a recess 25 formed in the end of at least one of the forks 20. When the pin 45 engages the recess 25, the fork 20 is latched in the end of the member 40. Then, when the system is raised, the lifting system, which has wheels, such as caster wheels, may be pulled or pushed to mobilize the gondola and the fork 20 remains latched in the channel formed by the end of the member 40. By lifting the pin 45 free of the recess 25 formed in the at least one fork 20, the fork 20 may be withdrawn from the channel 42, after the gondola is moved and the pair of opposing members are lowered to rest the gondola on the ground, for example. The pin 45 may be retained by a flange, such as a head 47 and/or threaded nuts 43, and/or a cotter pin or the like. Preferably, the pin may be easily raised to release the pin 45 from the recess 25.

FIG. 11B illustrates the interlocking relationship between two tongues 32, 34, at one end of a pair of support members, for example. When the opposing members 40, 41 are aligned on opposite sides of the gondolas supports and are mated, the tongues 32, 34 are retained by the receiving members 70 in the opposing member opposite of the tongues 32, 34.

Figure 5B:
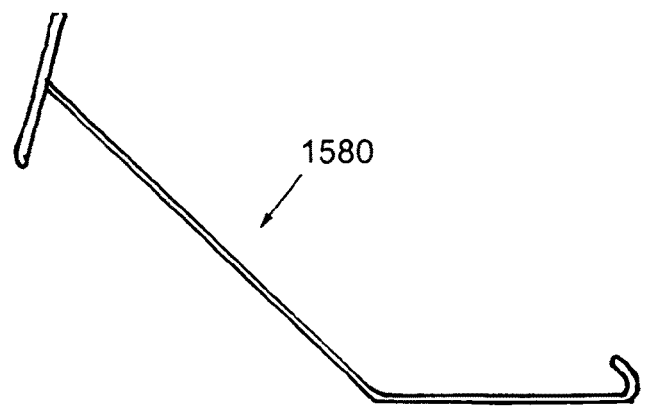
Figure 13A:
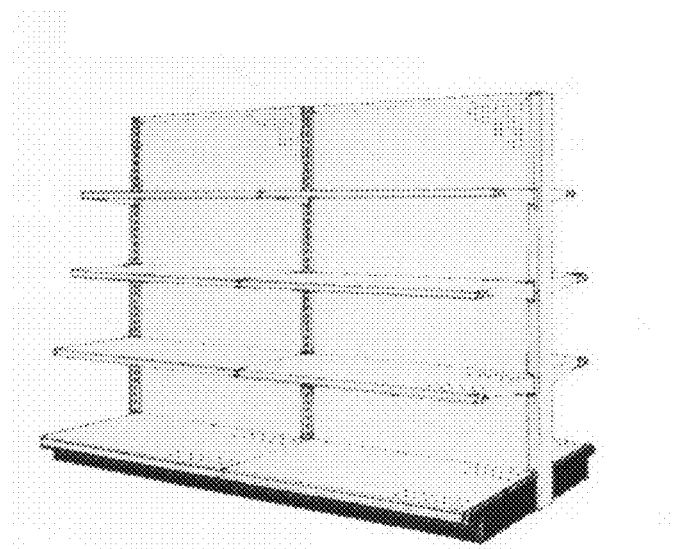
FIGS. 13A-13C illustrate a known gondola with (A) an assembled gondola run, (B) an exploded view of a gondola section, and (C) an end cap for terminating one end of the gondola run.
Figure 13B:
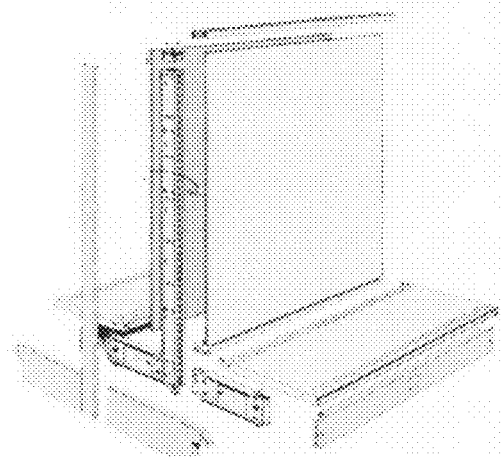
Figure 13C:
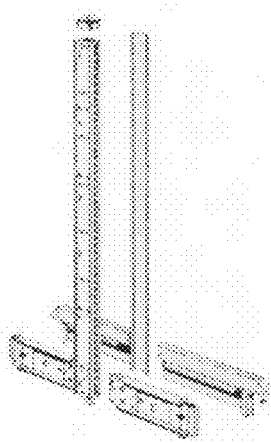

FIG. 14 illustrates an example of a system for mobilization of stocked gondolas 1 assembled and installed on one end of gondolas 1 having products 3 displayed on the gondolas 1, for example. A tongue 182 from an opposite half of a lift assembly 500 matingly engages a receiving member 70 of the half of the lift assembly 500 shown on an end of the gondolas 1. In a method of moving gondolas 1 a plurality of lift assemblies 500 are positioned along the length of the gondolas 1 such that the entire length of the gondolas 1 may be raised by the lift mechanisms of the trucks 148. When raised, the gondolas 1 may be moved on the caster wheels 149 of the trucks 148 by pulling or pushing the trucks 148, such as by the push-pull handle 1580 illustrated in FIG. 5B, for example. In one example, a hand crank 145 with a rack and pinion gear mechanism 142 is used to raise and lower the fork-like extensions 40, 20 attached to the truck 1401, as illustrated in the example of FIG. 5A. In another example, a hydraulically activated truck 1400 is used to raise and lower fork-like extensions 10, 20 attached to the truck 1400. Either mechanism, or other lift mechanisms, may be capable of raising and lowering gondolas 1, when the lift assembly 500 is aligned on opposite sides of gondola supports A, B, C and is matingly assembled by inserting the tongues 32, 34, 82, 124, 125, 126 into the receiving members 70, 122. In a preferred example, each tongue fits into its respective receiver provider an interlocking fit between each pair of support bar assemblies 500.

If the opposite halves 1000 of the support assembly 500 are properly aligned and matingly engaged, then the extensions 10, 20 of the trucks 147, 148 are aligned and engaged in tubular channels 42, 52 in the ends of tubular members 40, 41, 50, as illustrated in FIG. 5, FIG. 11A, FIG. 11B, and FIG. 14, for example. A bracket 120 is capable of being aligned with a middle support B, for example, by slidably engaging a continuous tubular member 40 on each of two opposite halves 1000 of the support assembly 500, as illustrated in FIG. 14, for example.

In the example of FIG. 14, the length of the two halves 1000 of the support assembly 500 is adjusted using extension member 60 and intermediate member 54 for aligning the ends of the tubular supports 40, 60 having tongues 82 with one outer support A of the gondolas 1 and the tongues 32, 34, 182 of a tubular member 50 with an opposite outer support C of the gondolas 1. The extendable member 60 and intermediate member 54 may telescopically engage to provide for adjusting of the length of the support assembly 1000 from one meter to several meters, for example. Since the gondola 1 is fully supported by the middle and outer supports A, B, C, items 3 do not have to be removed from the gondola 1, even for very wide gondolas 1, which otherwise requires labor intensive removal and restocking. Thus, the support assembly 500 provides for a method that saves substantial time and money compared to prior art methods of gondolas mobilization that could not be used to move wide gondolas. In prior art systems, lifts and wheels were only positioned on the outer supports A, C and could not provide support at all of the supports A, B, C. Another system is known that only provides support at a middle support B but not at all of the supports A, B, C.

In the example of FIGS. 15A-15E, views of an example of a preferred lifting mechanism 1403 are illustrated or sketched that comprise a hand crank 1530 (detailed view in FIG. 15C), a screw mechanism contained in a column 1550, such as a rack and pinion gear, for raising and lowering a coupling mechanism 1500 (detailed views in FIGS. 15D and 15E) attached to the column 1550 by one or more pins 1502. A pin 1502 may be biased into a hole 1556 in the column 1550 by a biasing mechanism 1503, adjustably. A pull knob 1501 may be used to release the pin 1502 from the hole 1556, as illustrated in FIGS. 15A and 15B, for example. The coupling mechanism 1500 may include one or more grabs 1510, 1511, which are capable of being mounted in slots on a plate or other mounting device. As illustrated in the example of FIGS. 15D and 15E, the grabs 1510, 1511 are both L-shaped members welded to a flared portion 1509 of the coupling mechanism 1500, for example. A shaft 1507 fits slidably around the column 1550 of the lifting mechanism 1403, for example. In an alternative embodiment, the coupling mechanism 1500 may be fixed to the column 1550 such as by welding.

A base 1560 includes a pair of casters 1558 and a mounting surface for mounting to a bracket 1562 of the column 1550. The coupling mechanism 1500 may include one or more stabilizers 1520 capable of extending toward the ground to provide another footer point of stabilizing the truck 1403 with respect to the plate 1593 or 1594, 1596, as disclosed in FIG. 5A. Alternatively, the coupling mechanism 1500 may include grabs, fasteners or another coupler for coupling directly or indirectly with a gondola. The coupling mechanism, as illustrated in FIGS. 15D and 15E, are provided with L-shaped grabs that are capable of mating with slots formed a gondola structure or in a mounting plate that may be attached to a mechanism for coupling to a gondola or support assemblies, such as the fork extensions 10, 20 of FIG. 11A and as illustrated in FIG. 5A, for example. In FIG. 5A, a plate 1593 and a pair of lateral members 1594, 1596 are shown for mounting the forks 10, 20 to an example of a rack and pinion lift mechanism 1401 or a hydraulic lift mechanism 1400, for example.

A handle 1530, such as illustrated in detail in FIG. 15C may include a rotatable grip 1532 and a ratchet coupling 1535 for removably attaching the handle to a ratchet mechanism in the head of the screw mechanism, such as by the biased detent ball 1537 engaging a groove in the ratchet mechanism 1545. A ratchet mechanism 1545 in the head 1540 attached to column 1550 is surprisingly useful, allowing precise simultaneous raising of a plurality of lift mechanisms by a plurality of users of a plurality of lifting mechanisms, even if one or more of the lifting mechanism are in areas having insufficient room to rotate the handle 1530 by 360 degrees. In addition, an unexpected advantage of having a removably coupled handle 1530 is that storage requirements for a mobilization system are greatly reduced compared to a system with a fixed handle. A U-shaped handle 1525 on the lifting mechanism 1403 provides for coupling to a pull bar-(not shown). A pull bar may have a hook on one end of an elongated member for coupling to the U-shaped handle 1525 and may have a handle on the opposite end of the elongated member. The pull bar may be used to pull or push the lifting mechanism 1403 during mobilization of a gondola 1, for example.

What is claimed is:

1. A pair of support assemblies for a gondola mobilization system, the pair of support assemblies comprising:
    two opposing, complimentary assemblies, a first of the two opposing, complimentary assemblies and a second of the two opposing, complimentary assemblies, each of the two opposing, complimentary assemblies comprising:
    a first extendable member;
    a sliding bracket slidably coupled to the first extendable member and supported by the first extendable member, the bracket having a tongue joined to the sliding bracket and extending outwardly from a lower side of the sliding bracket;
    a second extendable member telescopically inserted into the first extendable member such that a length of the support assembly is adjustable by sliding the second extendable member in relation to the first extendable member;
    a latching device for latching the second extendable member to a portion of the first extendable member, preventing the second extendable member from sliding in relation to the first extendable member when the latching device is engaged; and
    a first end bracket at a first end of each the respective two opposing, complimentary assemblies for coupling to a lift mechanism of a gondola mobilization system employing the pair of support assemblies,
    wherein the tongue of the sliding bracket of the first of the two opposing, complimentary assemblies is arranged such that the tongue engages a retaining member of the sliding bracket of the second of the two opposing, complementary assemblies, and the tongue of the sliding bracket of the second of the two opposing, complimentary assemblies is arranged such that the tongue engages a retaining member of the sliding bracket of the first of the two opposing, complimentary assemblies, when the pair of support assemblies are matingly coupled in the gondola mobilization system such that, when matingly coupled, the tongues of each of the sliding brackets interlinkingly couple together the sliding brackets with one another.

2. A gondola mobilization system comprising the pair of support assemblies of claim 1.

3. The system of claim 2, further comprising a lift mechanism.

4. The system of claim 3, wherein the lift mechanism comprises a plurality of casters.

5. The system of claim 3, wherein the lift mechanism comprises a handcrank.

6. The system of claim 5, wherein the handcrank is removably attached to the lift mechanism.

7. The system of claim 6, wherein the handcrank is coupled to the lift mechanism by a ratchet mechanism capable of converting rotational motion of the handcrank in one rotational direction to rotational motion of a screw jack of the lift mechanism while preventing rotational motion in the opposite rotational direction from rotating the screw jack.

8. The system of claim 3, wherein the lift mechanism includes at least one grab.

9. The system of claim 3, wherein the lift mechanism includes a pair of grabs.

10. The system of claim 9, wherein the pair of grabs are inserted into a pair of slots of a mounting member, and the mounting member is coupled to a pair of forks, and each of the pair of forks engage a respective one of the first assembly and the second assembly.

11. A method of mobilizing a gondola, comprising:
    inserting a pair of support assemblies according to claim 1 under a gondola such that the pair of support assemblies support the gondola at a plurality of supports of the gondola;
    aligning opposite ones of the sliding brackets of each of the pair of support assemblies such that the tongues of each of the sliding brackets interlinkingly couple the opposite ones of the sliding brackets one to the other, and the tongues of the sliding brackets support the gondola at one of the plurality of supports of the gondola;
    matingly coupling the pair of support assemblies to a lift mechanism;
    raising the pair of support assemblies using the lift mechanism; and
    moving the gondola without removing stockage from a shelf of the gondola.

* * * * *